(12) United States Patent
Terrell et al.

(10) Patent No.: US 12,196,421 B2
(45) Date of Patent: Jan. 14, 2025

(54) TRAILING EDGE FUEL INJECTION ENHANCEMENT FOR FLAME HOLDING MITIGATION

(71) Applicant: Power Systems Mfg., LLC, Jupiter, FL (US)

(72) Inventors: Dwain Terrell, Jupiter, FL (US); Matthew Yaquinto, Jupiter, FL (US); Fred Hernandez, Jupiter, FL (US); Hany Rizkalla, Stuart, FL (US); Nicolas Demougeot, Jupiter, FL (US); Peter John Stuttaford, Jupiter, FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 0 days.

(21) Appl. No.: 17/980,215

(22) Filed: Nov. 3, 2022

(65) Prior Publication Data
US 2023/0408094 A1     Dec. 21, 2023

Related U.S. Application Data

(60) Provisional application No. 63/275,124, filed on Nov. 3, 2021.

(51) Int. Cl.
*F23R 3/28* (2006.01)
*F23R 3/14* (2006.01)
(Continued)

(52) U.S. Cl.
CPC ............... *F23R 3/286* (2013.01); *F23R 3/14* (2013.01); *F02K 3/10* (2013.01); *F05D 2240/35* (2013.01);
(Continued)

(58) Field of Classification Search
CPC .... F23R 3/286; F23R 3/14; F23R 3/20; F23R 3/16; F02K 3/10; F23C 7/004; F23C 2900/07001; F23D 2900/14021
See application file for complete search history.

(56) References Cited

U.S. PATENT DOCUMENTS 5,069,029 A * 12/1991 Kuroda .................. F23R 3/346
                                                                    60/737
5,613,363 A    3/1997 Joshi
(Continued)

OTHER PUBLICATIONS

International Search Report and Written Opinion of corresponding PCT Application PCT/US2022/048849 dated Nov. 8, 2023, pp. 13.

*Primary Examiner* — Gerald L Sung
*Assistant Examiner* — Rene D Ford
(74) *Attorney, Agent, or Firm* — Hovey Williams LLP

(57) ABSTRACT

An injector for a combustor of a gas turbine engine is provided with a plurality of first vanes radially arrayed about a central axis of the injector and a plurality of second vanes radially arrayed about the central axis of the injector and disposed radially inward of the plurality of first vanes. A plurality of fuel injection holes are disposed nearer to a trailing edge than to a leading edge of the second vanes for injecting fuel into compressed air passing through over the second vanes. The trailing edge of each of the second vanes includes a non-planar profile configured to induce turbulence in the compressed air to thereby mix the fuel with the compressed air and reduce the surfaces on which undesirable flame anchoring may occur.

11 Claims, 12 Drawing Sheets

(51) Int. Cl.
  *F02K 3/10*   (2006.01)
  *F23C 7/00*   (2006.01)
  *F23R 3/20*   (2006.01)

(52) U.S. Cl.
  CPC .... *F05D 2250/14* (2013.01); *F05D 2250/184* (2013.01); *F23C 7/004* (2013.01); *F23C 2900/07001* (2013.01); *F23D 2900/14021* (2013.01); *F23R 3/20* (2013.01)

(56) References Cited

U.S. PATENT DOCUMENTS

| | | | |
|---|---|---|---|
| 5,647,200 A * | 7/1997 | Althaus | F23R 3/16 60/737 |
| 2009/0320485 A1 | 12/2009 | Wilbraham | |
| 2012/0285173 A1 | 11/2012 | Poyyapakkam | |
| 2012/0304652 A1 * | 12/2012 | Crawley | F23R 3/346 60/740 |
| 2016/0298845 A1 | 10/2016 | Nagai | |
| 2017/0191665 A1 | 7/2017 | Ciani | |
| 2019/0154263 A1 * | 5/2019 | Bothien | F23C 6/042 |
| 2021/0071869 A1 | 3/2021 | Stytsenko | |

\* cited by examiner

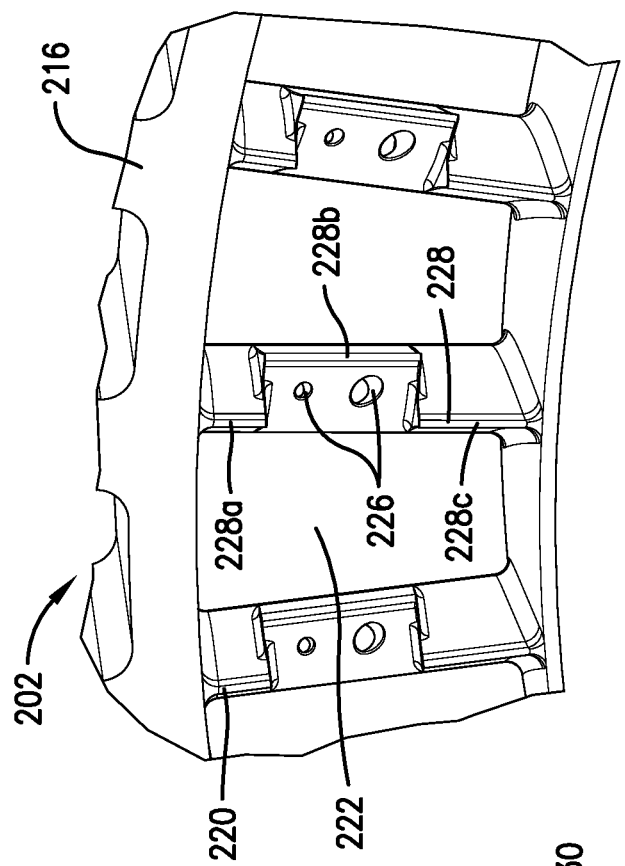
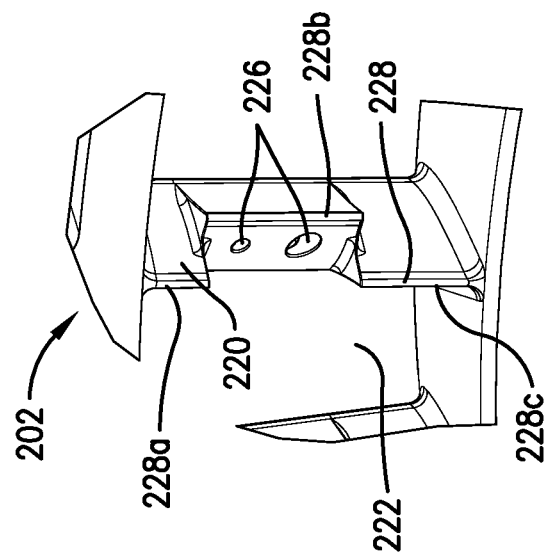
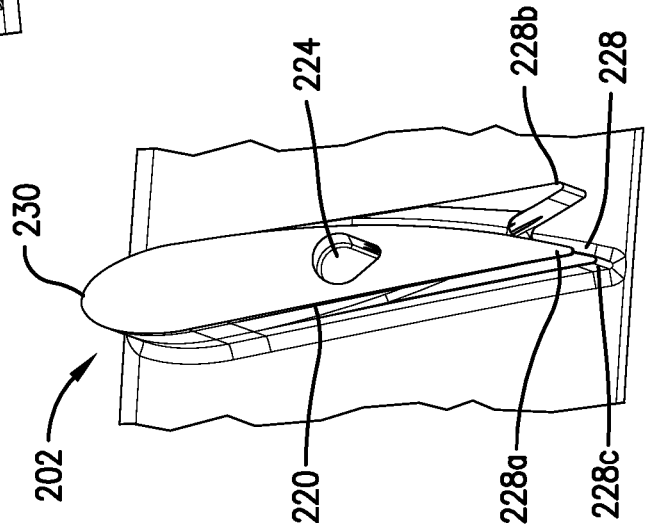
FIG. 5A.
FIG. 5B.
FIG. 5C.

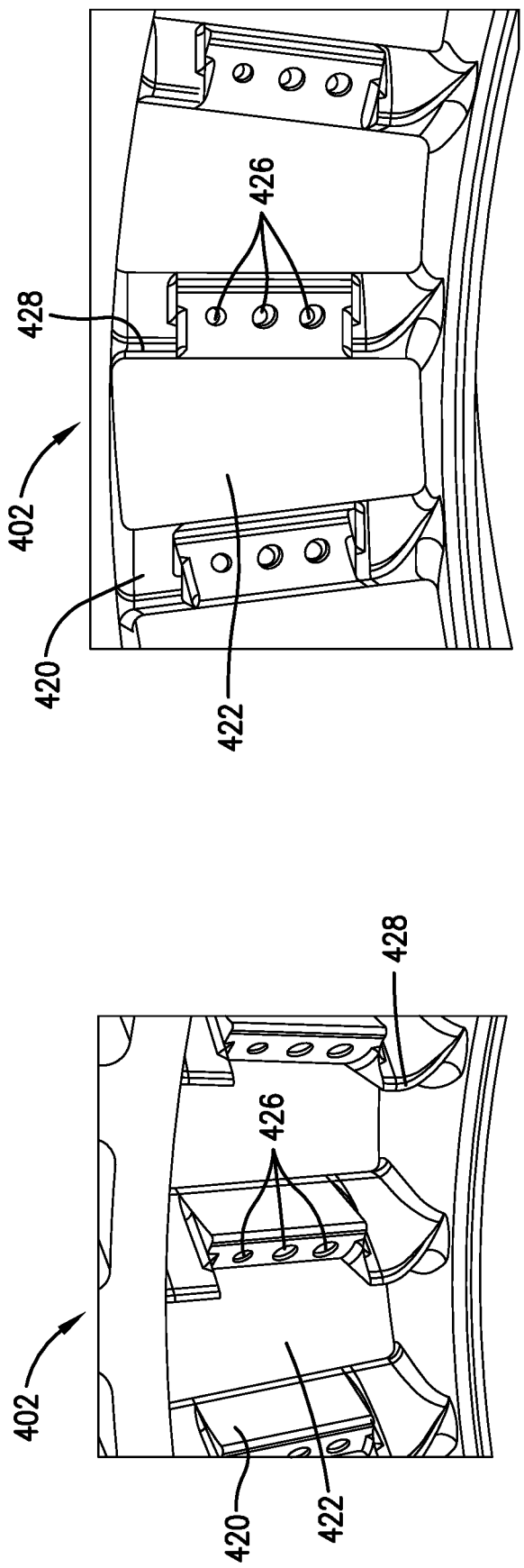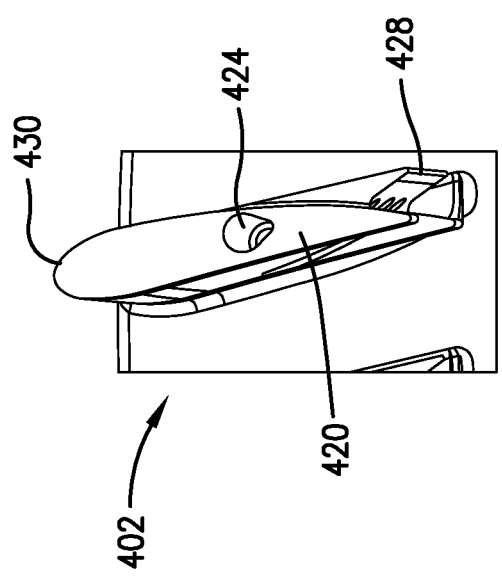
FIG. 7A.
FIG. 7B.
FIG. 7C.

TRAILING EDGE FUEL INJECTION ENHANCEMENT FOR FLAME HOLDING MITIGATION

BACKGROUND

The present disclosure relates generally to gas turbine engines and, more particularly, to injectors used to inject a mixture of compressed air and fuel into a combustor in the gas turbine engines.

Gas turbine engines are used to generate mechanical energy by combusting a fuel/air mixture within a combustor. Fuel and compressed air are delivered to the combustor through one or more fuel injectors. In one type of ring-shaped injector, spaced apart vanes define passages through which compressed air flows and is mixed with fuel injected into the flow path of the compressed air. Under certain operating conditions, a trailing edge of the injector and vanes may provide an undesired flame holding surface on which a combustion flame may become anchored and lead to an autoignition or a flashback event that may result in destruction of hardware in the gas turbine engine. While various types of protective equipment are used to detect and react to autoignition or flashback, such as by increasing air flow or by shutting down the gas turbine engine, these approaches may lead to production of increased levels of unwanted NOx emissions or significant downtime before the gas turbine engine is brought back online. A need thus exists for reducing or preventing autoignition or flashback from occurring in the first instance.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

Aspects of the disclosure relate to a gas turbine engine including a combustor having one or more fuel injectors. More particularly, aspects are directed to injectors including vanes having irregular trailing edge geometries that mitigate flame holding while improving mixing of fuel and compressed air.

In one aspect, the disclosure is directed to an injector for a combustor of a gas turbine engine comprising a plurality of first vanes radially arrayed about a central axis of the injector and a plurality of second vanes radially arrayed about the central axis of the injector and disposed radially inward of the plurality of first vanes. Each of the plurality of second vanes includes: a leading edge and a trailing edge; a plurality of fuel injection holes disposed nearer to the trailing edge than to the leading edge and configured to inject fuel into compressed air passing over the second vane; and a fuel feed hole in fluid communication with the plurality of fuel injection holes and configured to supply the fuel to the plurality of fuel injection holes, wherein the trailing edge includes a non-planar profile configured to induce turbulence in the compressed air to thereby mix the fuel with the compressed air.

In another aspect, the disclosure is directed to a combustor for a gas turbine engine comprising a combustion liner defining a combustion zone therein and a first injector surrounding the combustion liner. The first injector comprises: a plurality of first vanes radially arrayed about a central axis of the injector, each of the first vanes separated from an adjacent one of the first vanes by one of a plurality of first passages forming part of a radially outer flow path; and a plurality of second vanes radially arrayed about the central axis of the injector and disposed radially inward of the plurality of first vanes, each of the second vanes separated from an adjacent one of the second vanes by one of a plurality of second passages forming part of a radially inner flow path. Each of the plurality of second vanes includes: a leading edge and a trailing edge; a plurality of fuel injection holes disposed nearer to the trailing edge than to the leading edge and configured to inject fuel into compressed air passing through the radially inner flow path; and a fuel feed hole in fluid communication with the plurality of fuel injection holes and configured to supply the fuel to the plurality of fuel injection holes, wherein the trailing edge includes a non-planar profile configured to induce turbulence in the compressed air passing through the radially inner flow path to thereby mix the fuel with the compressed air upstream the combustion chamber.

In a further aspect, the disclosure is directed to a method of mixing fuel and air in a combustor of a gas turbine engine. The method comprises passing compressed air through an injector, wherein: the injector includes a plurality of first vanes radially arrayed about a central axis of the injector and a plurality of second vanes radially arrayed about the central axis of the injector and disposed radially inward of the plurality of first vanes, passing the compressed air through the injector includes directing a first portion of the compressed air over the plurality of first vanes and directing a second portion of the compressed air over the plurality of second vanes, and a trailing edge of each of the plurality of second vanes includes a non-planar profile thereby creating, at each respective trailing edge, at least one vortex of compressed air. The method further comprises injecting fuel into the at least one vortex of compressed air at each trailing edge thereby mixing the fuel with the second portion of compressed air.

BRIEF DESCRIPTION OF THE DRAWINGS

The present technology is described in detail below with reference to the attached drawing figures, in which like numerals represent the same components, and wherein:

FIGS. 5A-5C are partial, close-up views of the injector shown in FIG. 4;

FIGS. 7A-7C are partial, close-up views of a fourth embodiment of an injector for a gas turbine combustor, such as the combustor shown in FIGS. 1-2, according to aspects of the disclosure;

DETAILED DESCRIPTION

Figure 1:
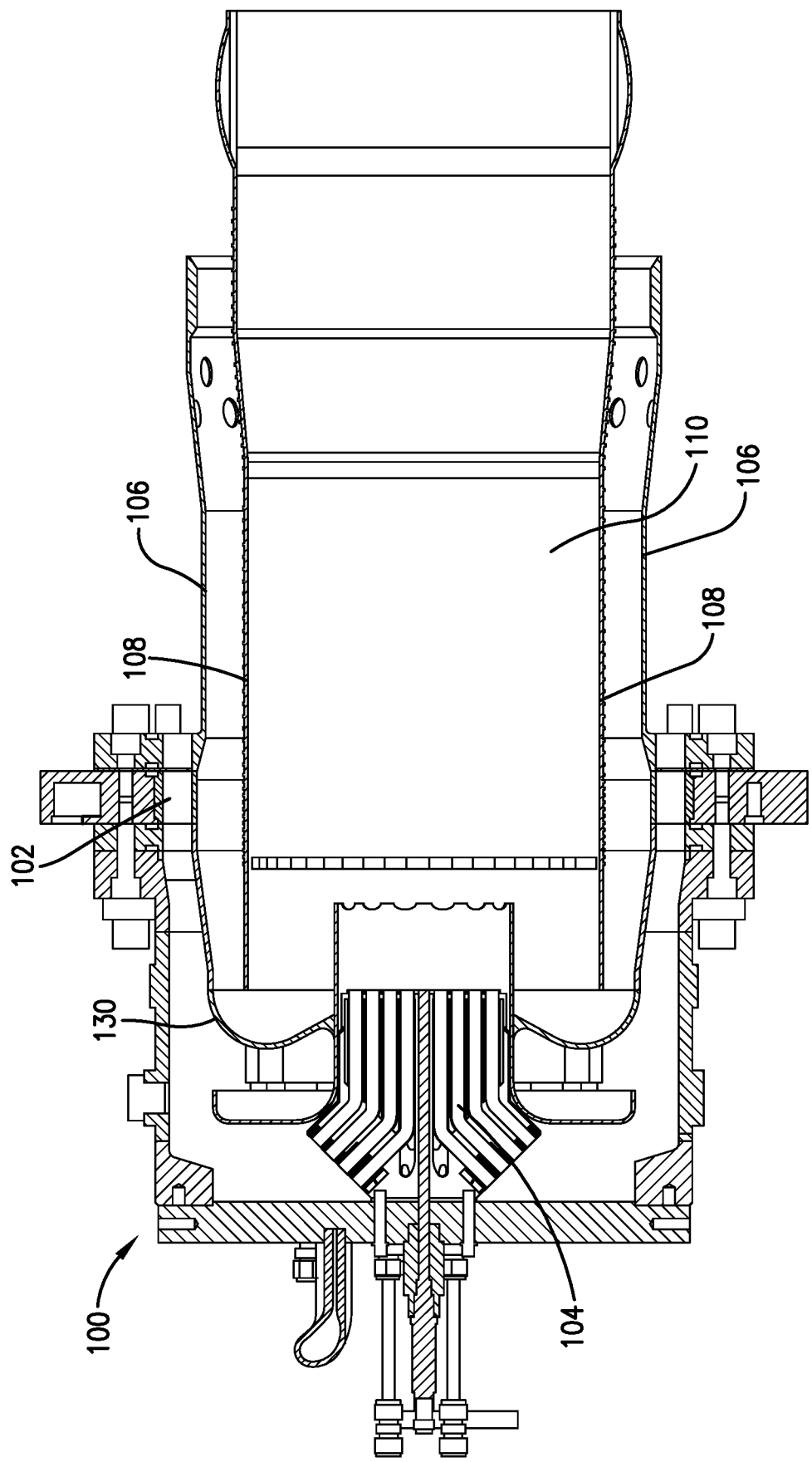
FIGS. 1-2 are cross-sectional views of a gas turbine combustor according to aspects of the disclosure.

Turning now to the drawings in greater detail and initially to FIG. 1, a combustor of a gas turbine engine according to aspects of the disclosure is designated generally by the numeral 100. The combustor 100 generally includes a first, or radially outward, injector 102, a second, or radially inward, injector 104, a generally cylindrical flow sleeve 106, and a generally cylindrical combustion liner 108 that is positioned radially inward from the flow sleeve 106 and generally defines a combustion zone 110. The first injector 102 is generally annularly shaped and surrounds the combustion liner 108 and is positioned at a downstream end of the flow sleeve 106. The second injector 104 is positioned radially inward of the combustion liner 108 at an inlet end of the combustion zone 110.

Figure 2:
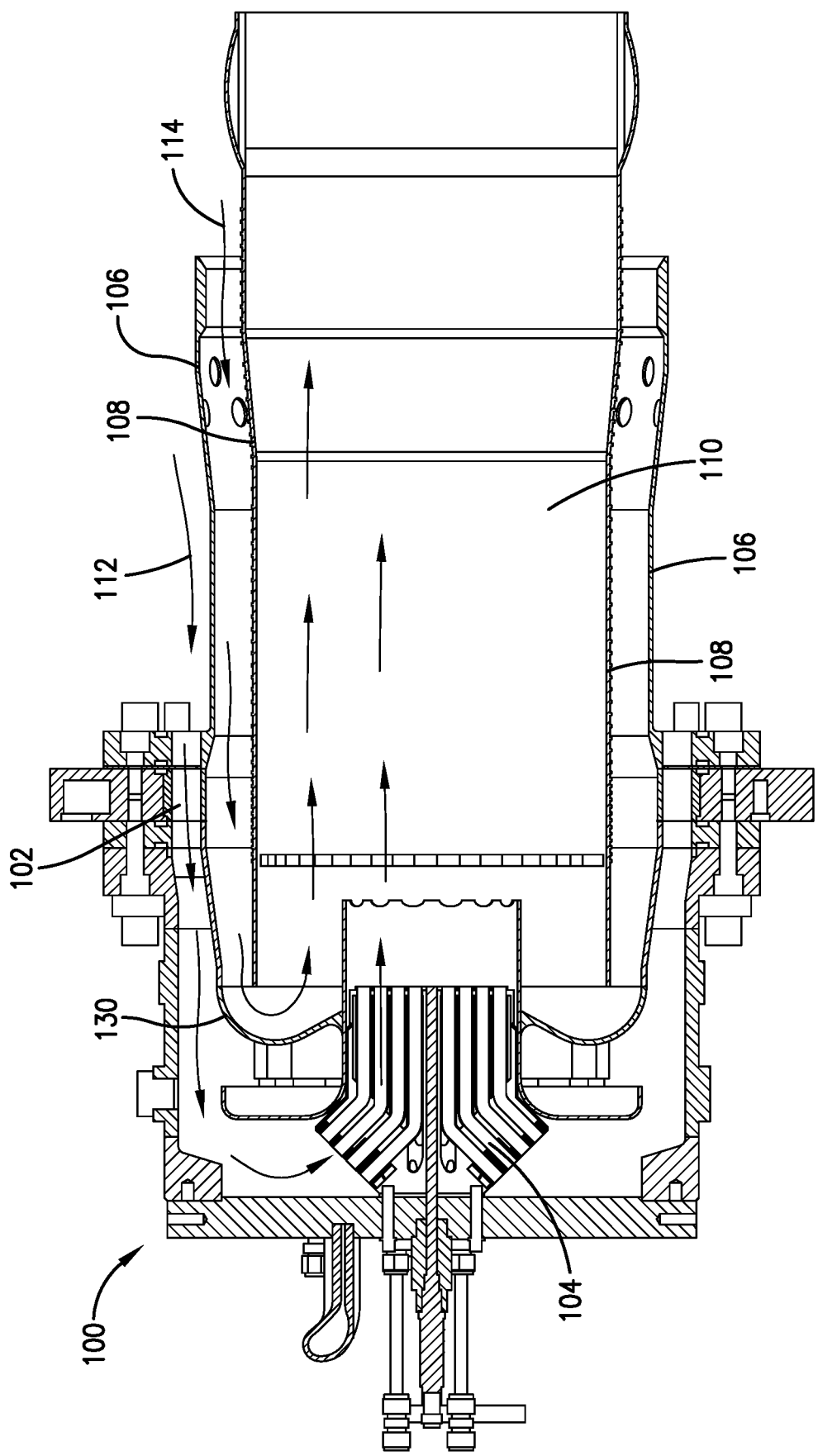

As best understood with reference to FIG. 2, during use of the combustor 100 compressed air is presented to both the first and second injectors 102, 104, where it mixes with a fuel source and then is ignited, supporting a flame within the combustion chamber 110. Compressed air following a radially outer path 112 along a radially outer surface of the flow sleeve 106 passes through radially outward vanes and/or openings provided in the first injector 102 without being mixed with fuel therein, instead continuing downstream to a portion of the combustor 100 where the air turns and passes through the second injector 104. Here, the compressed air mixes with a fuel source and is ignited to support a flame near a central axis of the combustor 100. Compressed air following a radially inner path 114 between the flow sleeve 106 and the combustion liner 108 passes through different (i.e., radially inward) vanes and/or openings provided in the first injector 102, where it is mixed with a fuel source. The fuel/air mixture then travels to a dome plate 130 or similar structure where it turns substantially 180 degrees, entering the combustion chamber 110 where it is ignited to support a flame radially outward of the flame supported by the second injector 104. In some embodiments, the first injector 102 is referred to as the "main" injector, while the second injector 104 is referred to as the "pilot" injector.

Figure 3B:
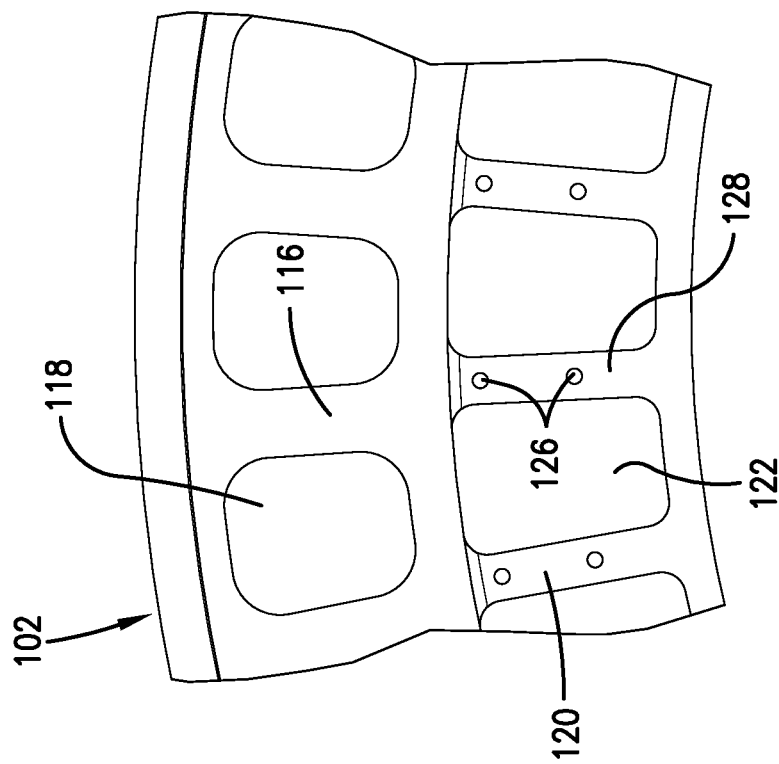
FIGS. 3A-3B are partial, close-up views of a first embodiment of an injector for a gas turbine combustor, such as the combustor shown in FIGS. 1-2, according to aspects of the disclosure.
Figure 3A:
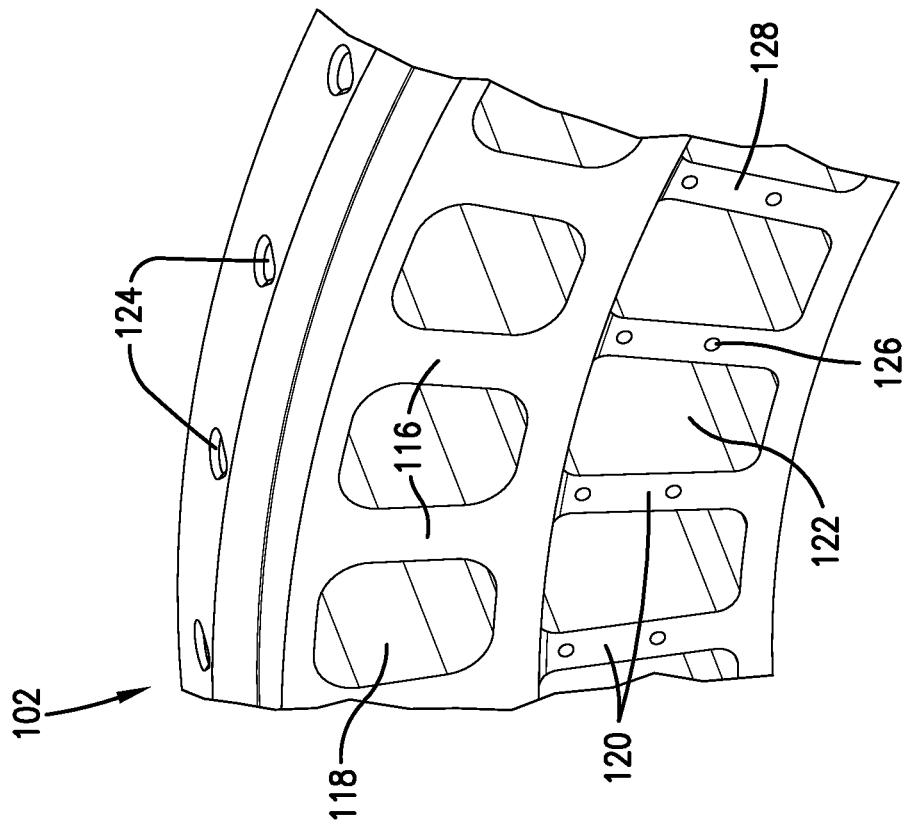

FIGS. 3A-3B show portions of one embodiment of the first, or main, injector 102 used to mix fuel and air passing through the radially inner path 114. In this embodiment, the first injector 102 includes a plurality of radially outward first vanes 116 radially arrayed about a central axis of the combustor 100, with neighboring ones of the plurality of first vanes 116 defining a plurality of first passages 118 therebetween. As seen in FIG. 3A, the first vanes 116 and passages 118 do not include any fuel injection openings or similar structures therein, and thus the compressed air in the radially outer path 112 passes through the openings 118 without mixing with any fuel and continues downstream to the second injector 104.

However, the first injector 102 also includes a plurality of second vanes 120 radially inward of the plurality of first vanes 116 and similarly radially arrayed about a central axis of the combustor 100. Neighboring ones of the plurality of second vanes 120 define a plurality of second passages 122 therebetween, through which compressed air traveling along the radially inner path 114 passes. Each of the vanes 120 generally includes a planar leading edge (not shown) and a planar trailing edge 128, with the planar leading edge and the planar trailing edge 128 extending substantially perpendicular, or cross-streamwise, to a direction of airflow within the injector 102. Moreover, each of the vanes 120 includes a plurality of fuel injection holes 126 provided at the trailing edge 128 (in this instance, in the planar face located at the trailing edge 128), which are in fluid communication with a plurality of fuel feed holes 124. Fuel from a manifold or similar structure (not shown) is fed to the compressed air passing along the radially inner path 114 via the fuel feed holes 124 and the fuel injection holes 126. More particularly, as the compressed air passes through the second passages 122 and over the vanes 120, the air is mixed with fuel exiting the fuel injection holes 126 proximate the trailing edge 128 of each vane 120. The fuel/air mixture thereafter continues along the radially inner path 114 to the dome plate 130 (FIG. 2) or similar structure that is positioned at an inlet end of the combustion zone 110. The dome plate 130 reverses the direction of flow of the fuel/air mixture and delivers it into an inlet end of the combustion zone 100 for ignition.

In this embodiment, the planar face of the trailing edge 128 of each vane 120 provides a surface on which a flame may anchor during operation of the combustor 100. Flames anchored at this portion of the radially inner path 114 may be undesirable because the anchored flames may lead to premature ignition of the fuel/air mixture, damage to the first fuel injector 102 or other components, or other undesirable drawbacks. Thus, according to some embodiments of the technology described hereafter, the leading or trailing edge of the vanes of the first injector 102 include an irregular or non-planar profile reducing the surfaces which may lead to flame anchoring while improving mixture of the fuel and air along the radially outer and/or inner paths 112, 114, thereby resulting in a more efficient burning and reduced emissions, among other benefits.

Figure 4:
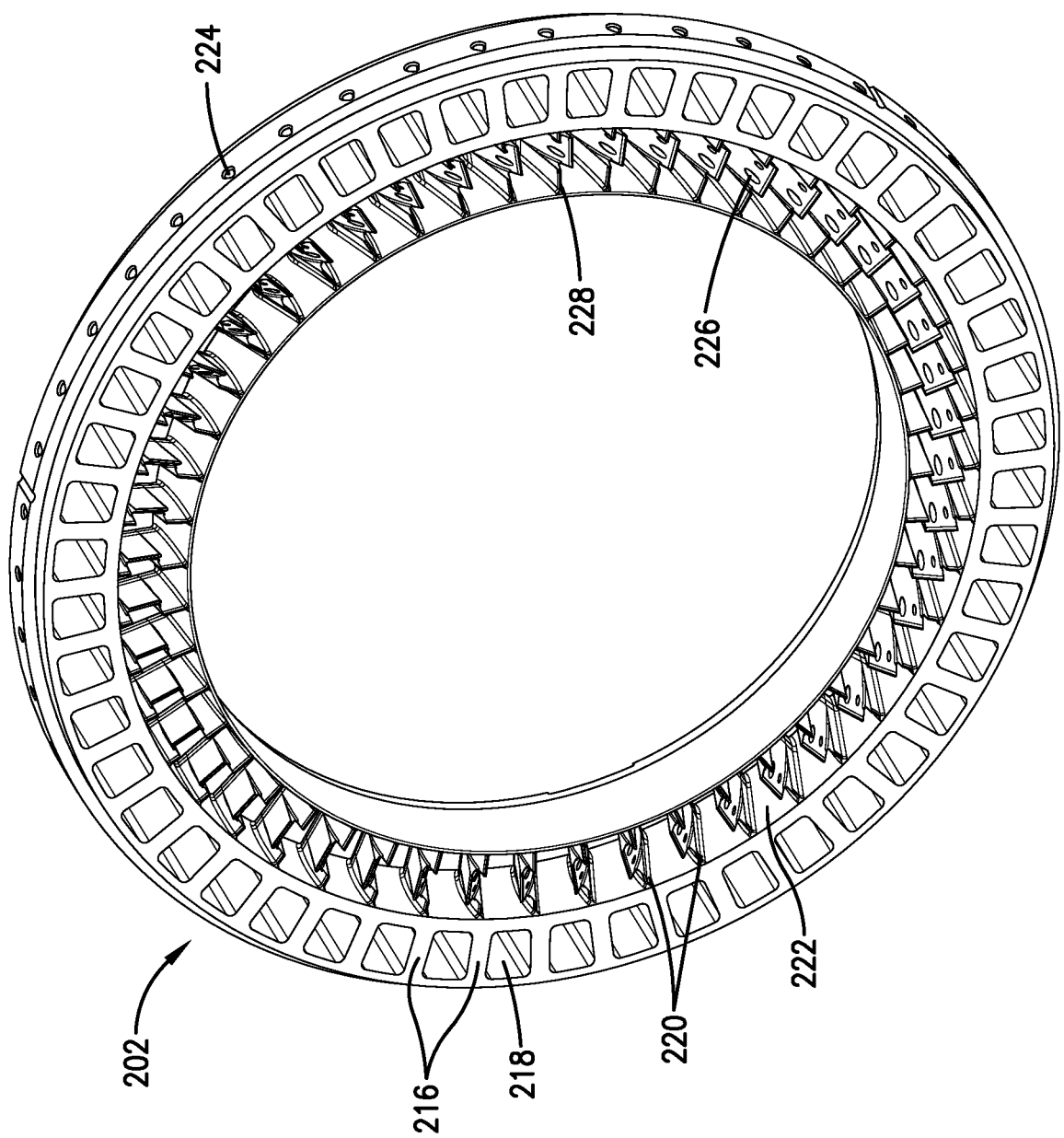
FIG. 4 is a perspective view of a second embodiment of an injector for a gas turbine combustor, such as the combustor shown in FIGS. 1-2, according to aspects of the disclosure.

FIG. 4 shows one embodiment of an improved first injector 202 according to aspects of the disclosure. In this embodiment, the first (or, alternatively, main) injector 202 is generally annularly shaped and includes a radial array of first vanes 216 radially outward of a radial array of second vanes 220. Neighboring ones of the plurality of first vanes 216 define a plurality of first passages 218, while neighboring ones of the plurality of second vanes 220 define a plurality of second passages 222. Again, as discussed with the embodiment of the first injector 102 shown in FIGS. 3A-3C, when installed and used in a combustor 100, compressed air passing to the second injector 104 along the radially outer path 112 will pass through the plurality of first openings 218 and over the plurality of first vanes 220 without mixing with fuel and continue downstream to the second injector 104, while compressed air passing along the radially inner path 114 will pass through the plurality of second passages 222, through the second passages 122 and over the plurality of second vanes 220, and mix with fuel. In that regard, the first injector 202 includes a plurality of fuel feed holes 224, each in communication with a plurality of fuel injection holes 226 provided on a trailing edge 228 of each second vane 220 or nearer the trailing edge 228 than a leading edge 230 (FIG. 5C).

As best seen in FIGS. 5A-5C, which show close-up portions of the first injector 202, the trailing edge 228 of each radially inner vane 220 includes a stepped profile. More particularly, the trailing edge 228 in this embodiment includes three distinct portions, 228a, 228b, and 228c. The radially outer first portion 228a and the radially inner third portion 228c of the trailing edge 228 are circumferentially offset from the intermediately positioned second portion 228b. In this embodiment, each vane 220 includes two fuel injection holes 226, which are provided on the second portion 228b of the trailing edge 228. However, in other embodiments the vanes 220 may include more or less fuel injection holes 226 and/or one or more of the fuel injection holes 226 may be located elsewhere (i.e., on one of the first or third portions 228a, 228c of the trailing edge 228) without departing from the scope of the disclosure. Moreover, in this embodiment the radially inner fuel injection hole 226 is bigger (i.e., has a larger diameter) than the radially outer fuel injection hole 226. For example, in one non-limiting example the inner fuel injection hole 226 has a diameter of approximately 0.112 inches, while the outer fuel injection hole 226 has a diameter of approximately 0.059 inches. In other embodiments, the fuel injection holes 226 may be the same size, the radially outer fuel injection hole 226 may be bigger than the radially inner fuel injection hole 226, and/or the fuel injection holes 226 may be differently shaped or configured without departing from the scope of the disclosure.

The profile of the vanes 220 shown in FIGS. 4 and 5A-C may exhibit mixing and flame-holding mitigation benefits as compared to, e.g., the embodiment of the first injector 102 shown in FIGS. 3A-3C. Namely, the leading edge 230 (FIG. 5C) of each vane 220 is rounded similar to a leading edge of an airfoil, providing enhanced flow and aerodynamic benefits; i.e., the rounded leading edge 230 reduces pressure loss of the compressed air flowing around the vanes 220. The stepped profile of the trailing edge 228 increases mixing at the trailing edge 228 of the vane 220 because the irregular profile introduces turbulence, causing the compressed air passing over the trailing edge 228 to swirl and mix with fuel leaving the fuel injection holes 226. In this regard, the fuel injection holes 226 are located and configured such that the fuel exiting therefrom is injected into and entrapped by the swirling compressed air of the vortices created by the stepped profile of the trailing edge 228, enhancing mixing of the fuel with the compressed air.

Moreover, because there is no planar face provided substantially perpendicular to the compressed airflow at the trailing edge 228 (in contrast to the planar face provided at the trailing edge 128 of the vane 120), there is beneficially no surface for a flame to anchor. Put another way, there are no aft-facing base areas of the vanes 220, thereby reducing or eliminating flame-holding at the first injector 202. Thus, the stepped profile of the trailing edge 228 of the vanes 220 reduces unwanted flame anchoring upstream from the combustion zone 110.

In the depicted embodiment shown in FIGS. 5A-C, the second portion 228b of the trailing edge 228 is longer, in the radial direction, than the third portion 228c, and the second portion 228b and third portion 228c are both longer than the first portion 228a. In other embodiments, the vane 220 may be otherwise configured, such as, e.g., having two or more of the stepped portions 228a, 228b, 228c having the same length in the radial direction, or having one or both of the stepped portions 228a, 228c being longer than the stepped portion 228b without departing from the scope of the disclosure. Moreover, in some embodiments the vanes 220 may include more or less stepped portions at the trailing edge 228 than is depicted in FIGS. 4 and 5A-C without departing from the scope of the disclosure, such as, e.g., two stepped portions or four or more stepped portions. In such embodiments, distal ends of neighboring ones of the stepped portions will be spaced apart and alternate in the circumferential direction, similar to the configuration of stepped portions 228a and 228b in FIGS. 4 and 5A-C.

The trailing edge 228 of the plurality of second vanes 220 may be alternatively configured while providing similar benefits without departing from the scope of the disclosure, as are shown in the embodiments depicted in FIGS. 6A-8C. In the embodiments shown in FIGS. 6A-8C, the depicted vanes 320, 420, 520 form part of a first, or main, injector 302, 402, 502, respectively, similar to the first injector 202 shown in FIG. 4. In this regard, although not shown, the injectors 302, 402, 502 will include a second radial array of vanes radially outward of the depicted vanes 320, 420, 520, which would be similarly configured to the vanes 216 shown in FIG. 4 and thus are not discussed again for convenience.

Figure 6B:
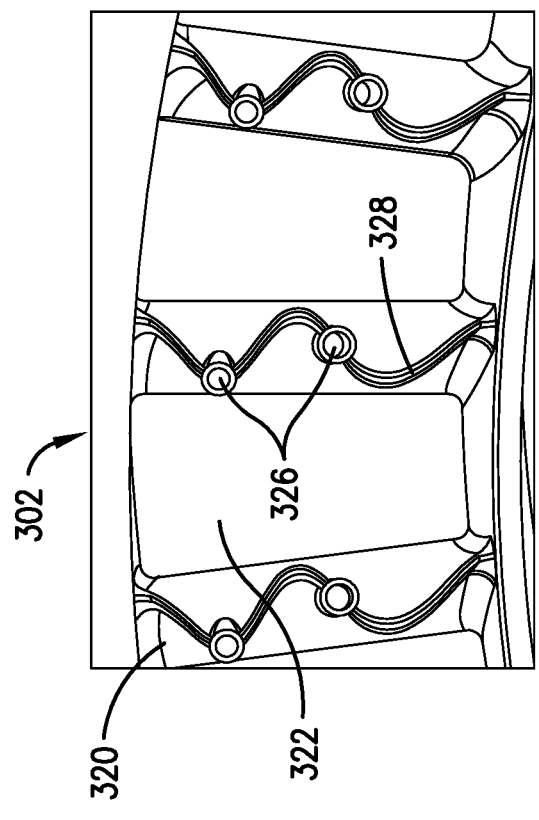
FIGS. 6A-6C are partial, close-up views of a third embodiment of an injector for a gas turbine combustor, such as the combustor shown in FIGS. 1-2, according to aspects of the disclosure.
Figure 6C:
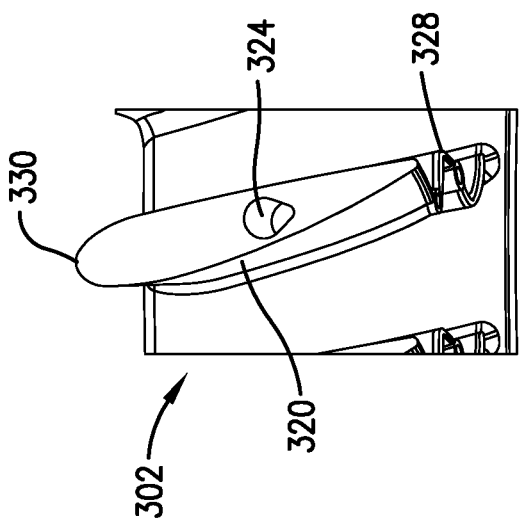
Figure 6A:
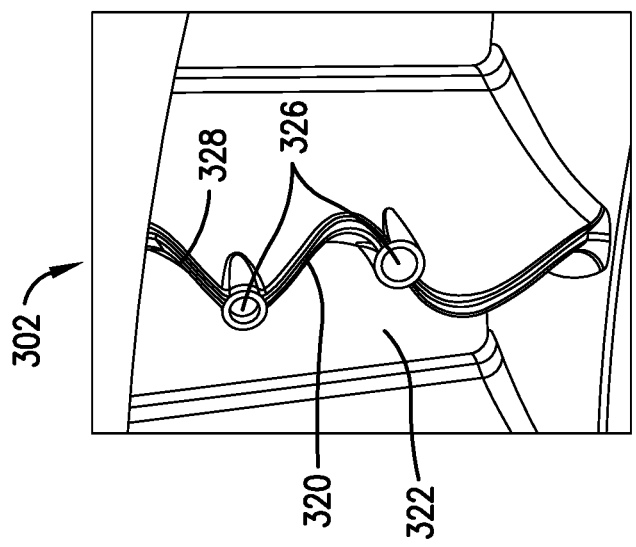

FIGS. 6A-6C show vanes 320 of the first injector 302 that include a waved trailing edge 328 profile of the vanes 320. The waved trailing edge 328 profile may generally follow the contour of a sinusoidal or similar wave, with one or more fuel injection holes 326 (in the depicted embodiment, two) provided along the wave.

The injector 402 shown in FIGS. 7A-7C includes a trailing edge 428 profile of the vanes 420 that includes both a stepped portion and a wave-like portion radially inward of the stepped portion, although in other embodiments the trailing edge profile 428 could include a wave-like portion radially outward of the stepped portion instead of or in addition to the radially inward stepped portion. Moreover, in this embodiment the stepped portion includes three fuel injection holes 426. The holes 426 may be of equal size or varying size. In the depicted embodiment, the two radially inward holes have an approximately equal cross-sectional area, while the radially outward fuel injection hole 426 is smaller. However, in other embodiments the holes 426 may be otherwise sized and configured without departing from the scope of the disclosure such as, e.g., a configuration in which the largest fuel injection hole 426 is provided at least at a radially outermost location.

Figure 8B:
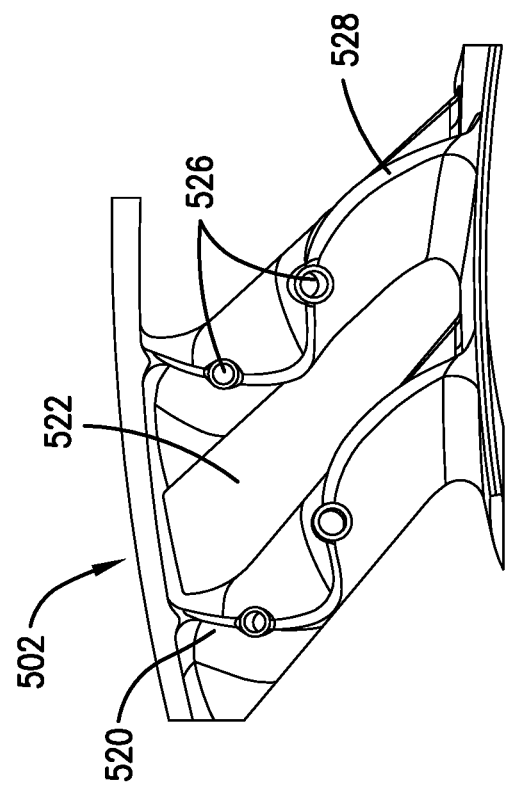
FIGS. 8A-8C are partial, close-up views of a fifth embodiment of an injector for a gas turbine combustor, such as the combustor shown in FIGS. 1-2, according to aspects of the disclosure.
Figure 8C:
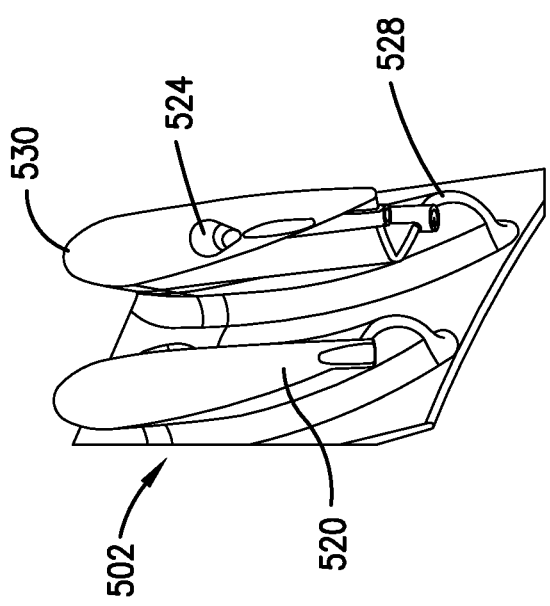
Figure 8A:
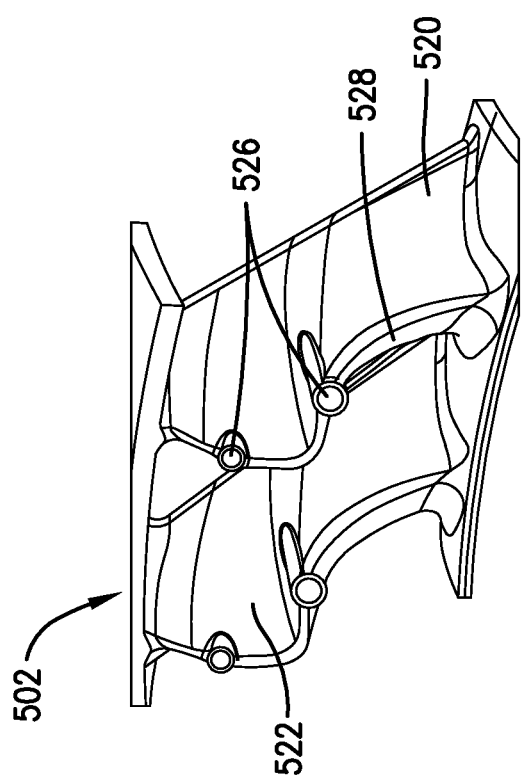

FIGS. 8A-8C show a trailing edge 528 profile of the vanes 520 in the first injector 502 that is wavy, but irregular. That is, the profile does not generally follow a sinusoidal or similar wave, but otherwise includes smooth arcs oscillating in the circumferential direction, with a pair of fuel injection holes 526 provided on the ridge of the wave. In some embodiments, the trailing edge 528 profile of this embodiment may be described as an angled sinusoidal wave, an irregular sinusoidal wave, a skewed sinusoidal wave, or similar. Again, more or less fuel injection holes 526, and fuel injection holes 526 of varying diameters, can be implemented without departing from the scope of the disclosure. FIGS. 8A-8C demonstrate that aspects of the disclosure include a wide array of trailing edge geometries, even irregular waves and similar, that provide the benefits of enhanced mixing at the trailing edge and mitigated flame anchoring, among others.

Figure 9B:
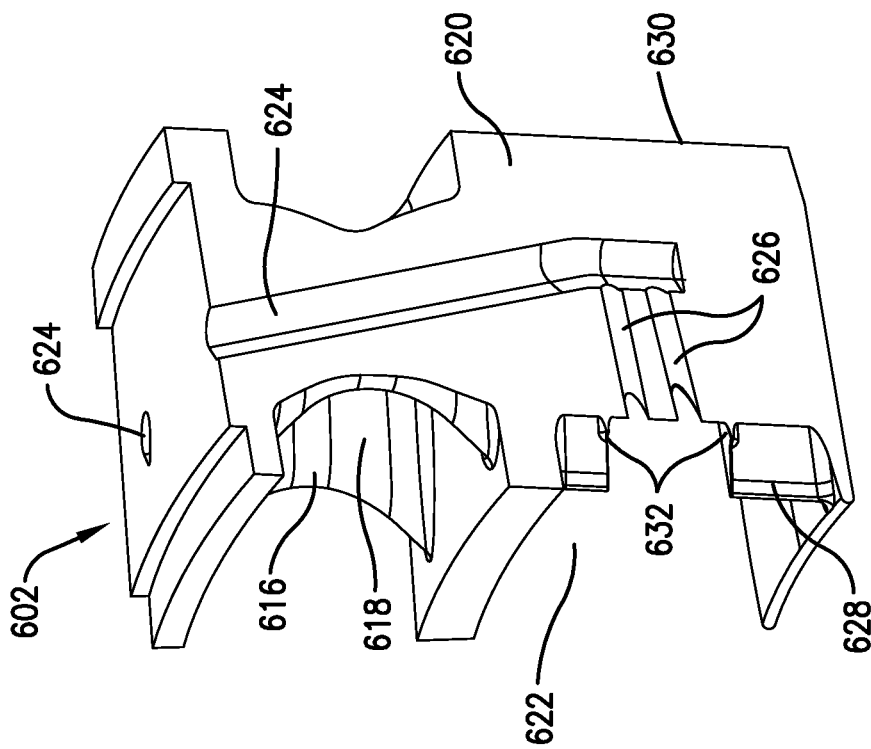
FIGS. 9A-9B are partial, close-up views of a sixth embodiment of an injector for a gas turbine combustor, such as the combustor shown in FIGS. 1-2, according to aspects of the disclosure.
Figure 9A:
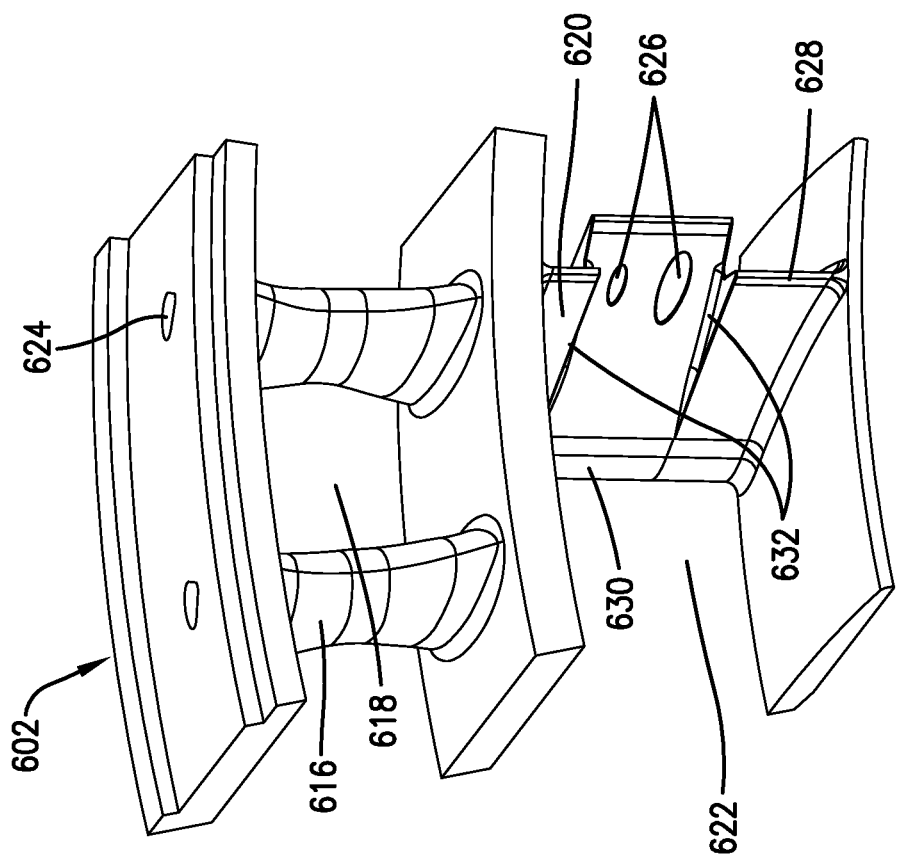
Figure 10:
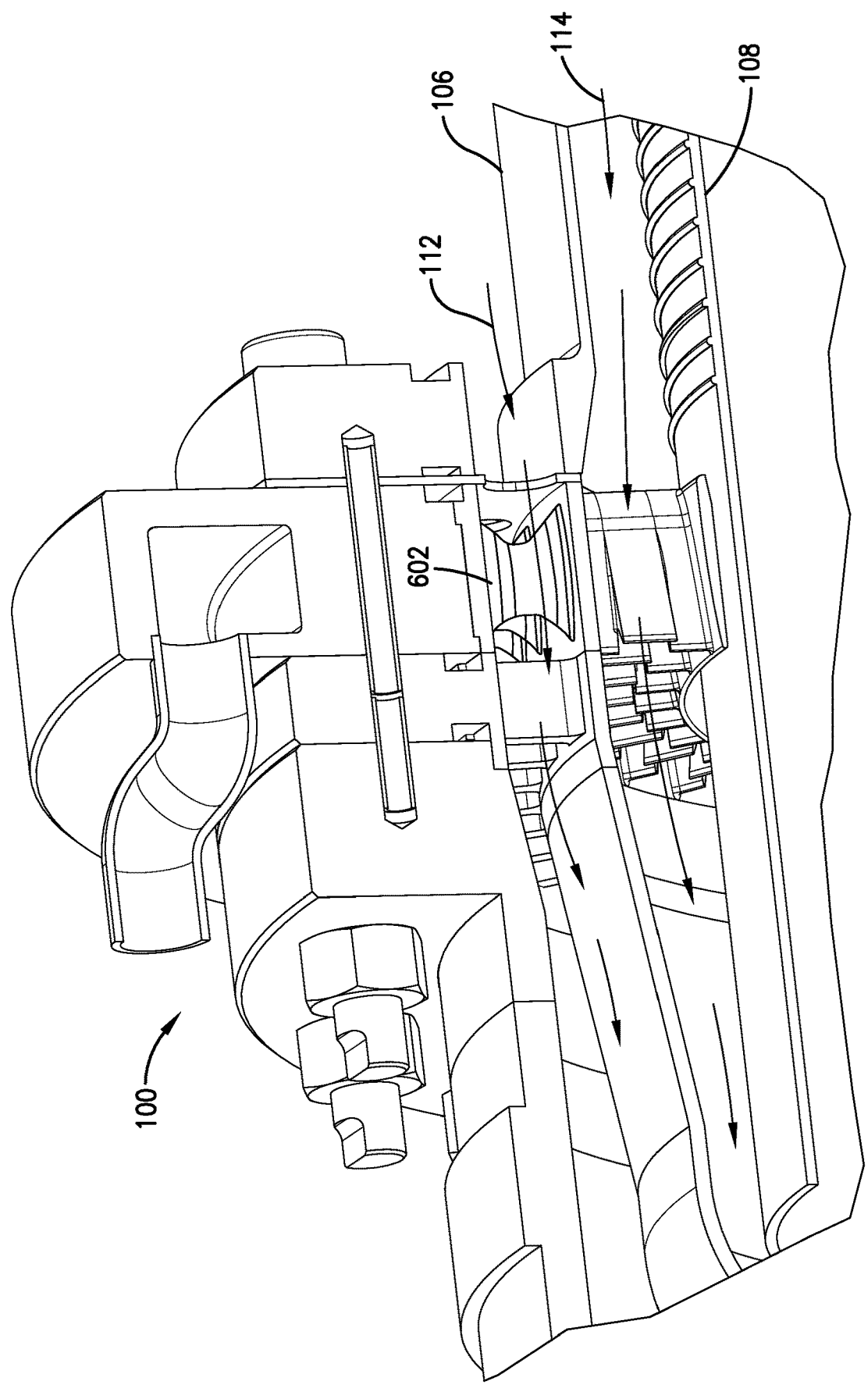
FIG. 10 is a partial, close-up view of a combustor of a gas turbine engine employing the injector shown in FIGS. 9A-9B.

FIGS. 9A-9B show another embodiment of a first injector 602 according to aspects of the disclosure. In this embodiment, the plurality of first vanes 616 are substantially elliptical in cross-section; that is, both the leading edges and trailing edges of the vanes 616 are rounded thereby providing a more streamlined flow and thus enhanced airflow properties such as reduced pressure drop, allowing the compressed air to freely flow along the radially outer flow path 112 to the second injector as best illustrated in FIG. 10. The plurality of second vanes 620 in this embodiment are similar in configuration to the second vanes 220 shown in FIGS. 4 and 5A-C, and thus will not be discussed again in detail. However, in this embodiment the circumferentially stepped portions of the trailing edge 628 include rounded or filleted transition edges 632 separating the stepped portions. These rounded or filleted transition edges 632 reduce thermal and other stresses at the transition between the circumferentially stepped portions, thereby improving the life of the injector 602 and the plurality of second vanes 620 thereof. Moreover, the rounded or filleted transition edges 632 improve aerodynamic mixing of the compressed air and fuel provided by the fuel injection holes, providing a more homogenous mixture to the combustion zone.

Again, FIG. 10 shows a partial cross-sectional view of a combustor 100 employing the first injector 602, which demonstrates how the compressed air flows along the radially outer and inner flow paths 112, 114. Moreover, as seen in FIG. 10, the improved mixing and similar benefits of the injectors described herein may permit inclusion of the injectors in a combustor 100 without the need for tear strips, seal lands, knurling, finger seals, or similar features on the outer surface of the combustion liner 108. That is, as shown in FIG. 10, the radially outer surface of the combustion liner 108 downstream of the first injector 602 is bare, unlike known combustors in which tear strips, seal lands, knurling, finger seals or similar features are employed. This in turn reduces the use of surfaces upstream of the combustion zone 110 that could otherwise lead to flame holding or flame anchoring.

Figure 11B:
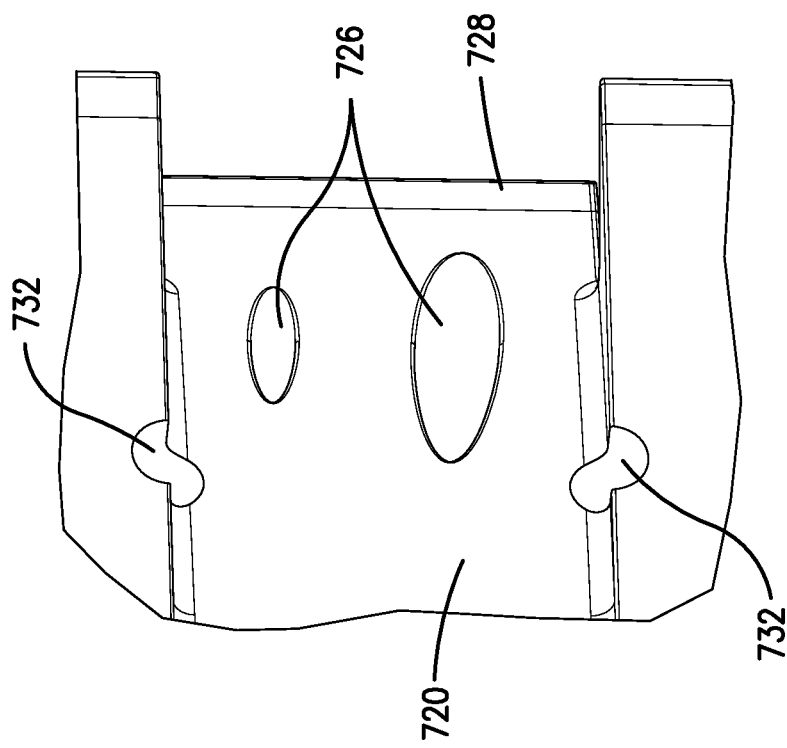
FIGS. 11A-11B are partial, close-up views of a seventh embodiment of an injector for a gas turbine combustor, such as the combustor shown in FIGS. 1-2, according to aspects of the disclosure.
Figure 11A:
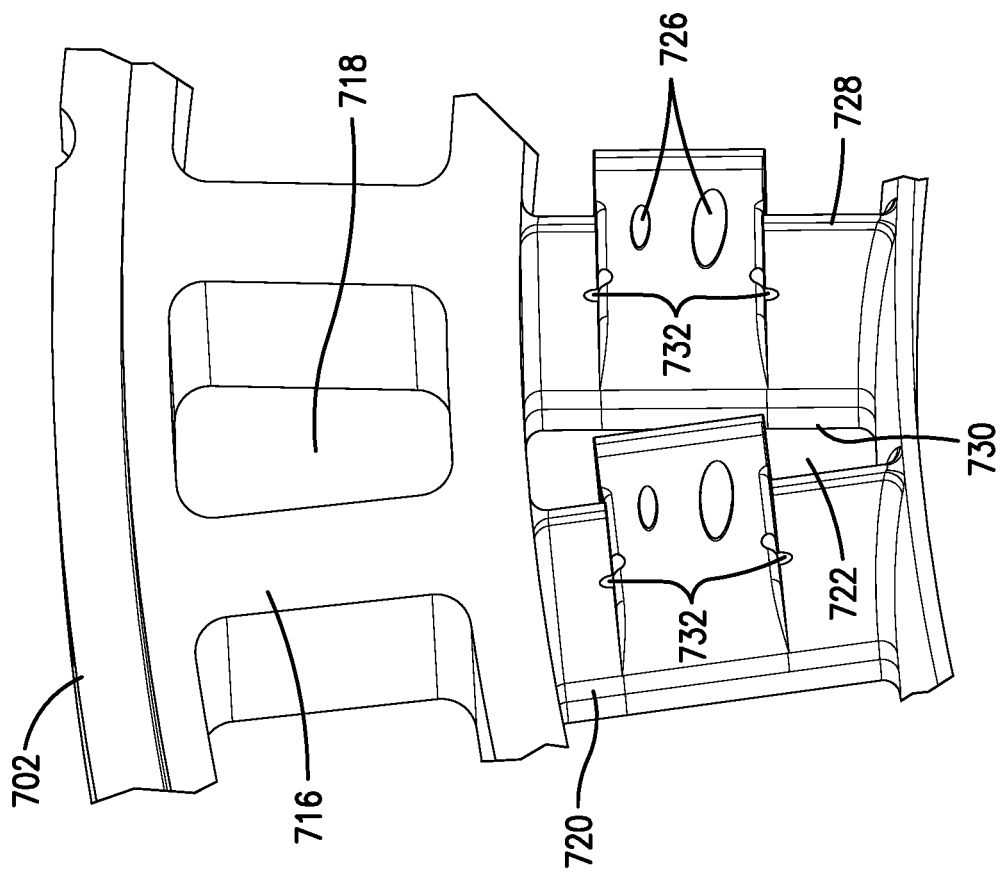

FIGS. 11A-11B show yet another example embodiment of a first injector 702. In this embodiment, the plurality of first vanes 716 are similar in construction to the flat-surfaced embodiment shown in FIG. 4 and others, but in other embodiments the plurality of first vanes 716 could include an elliptical or similar cross-section such as the plurality of first vanes 616 shown in FIGS. 9A-10. In this embodiment, however, the transition areas between the circumferentially stepped portions of the trailing edge 728 of the plurality of second vanes 720 include a relief cut 732, as best seen in FIG. 11B. Similar to the filleted or rounded transition zones 632 shown in FIGS. 9A-10, the relief cuts 732 of this embodiment reduce thermal and other stresses on the plurality of second vanes 720 while providing enhanced mixing of compressed air and fuel at the trailing edge 728 of the vanes 720.

In some embodiments, additive manufacturing may be employed to achieve the complex and irregular geometries of the trailing edges of the second vanes, which may otherwise be difficult to manufacture using traditional manufacturing techniques such as casting and the like. This may be more readily understood with reference to FIG. 12, which is a partial cross-sectional view of the plurality of second vanes 220 in the first injector 202 discussed above in connection with FIGS. 4-5C. The manufacturing techniques discussed herein would apply equally well to each of the embodiments discussed and contemplated by this disclosure.

As should be appreciated, additive manufacturing involves the building up of an article layer by layer, generally following a plurality of essentially 2D "slices" of a 3D model of the article. In this embodiment, the first injector 202 and/or the vanes 220 thereof are built up from the leading edge 230 to the trailing edge 228, as generally indicated by the build direction arrow 134 shown in FIG. 12. This allows for the inclusion of the complex and irregular trailing edge geometries discussed herein without the need for expensive and tedious molds and the like and while reducing or eliminating post-manufacturing machining or similar processes.

Figure 12:
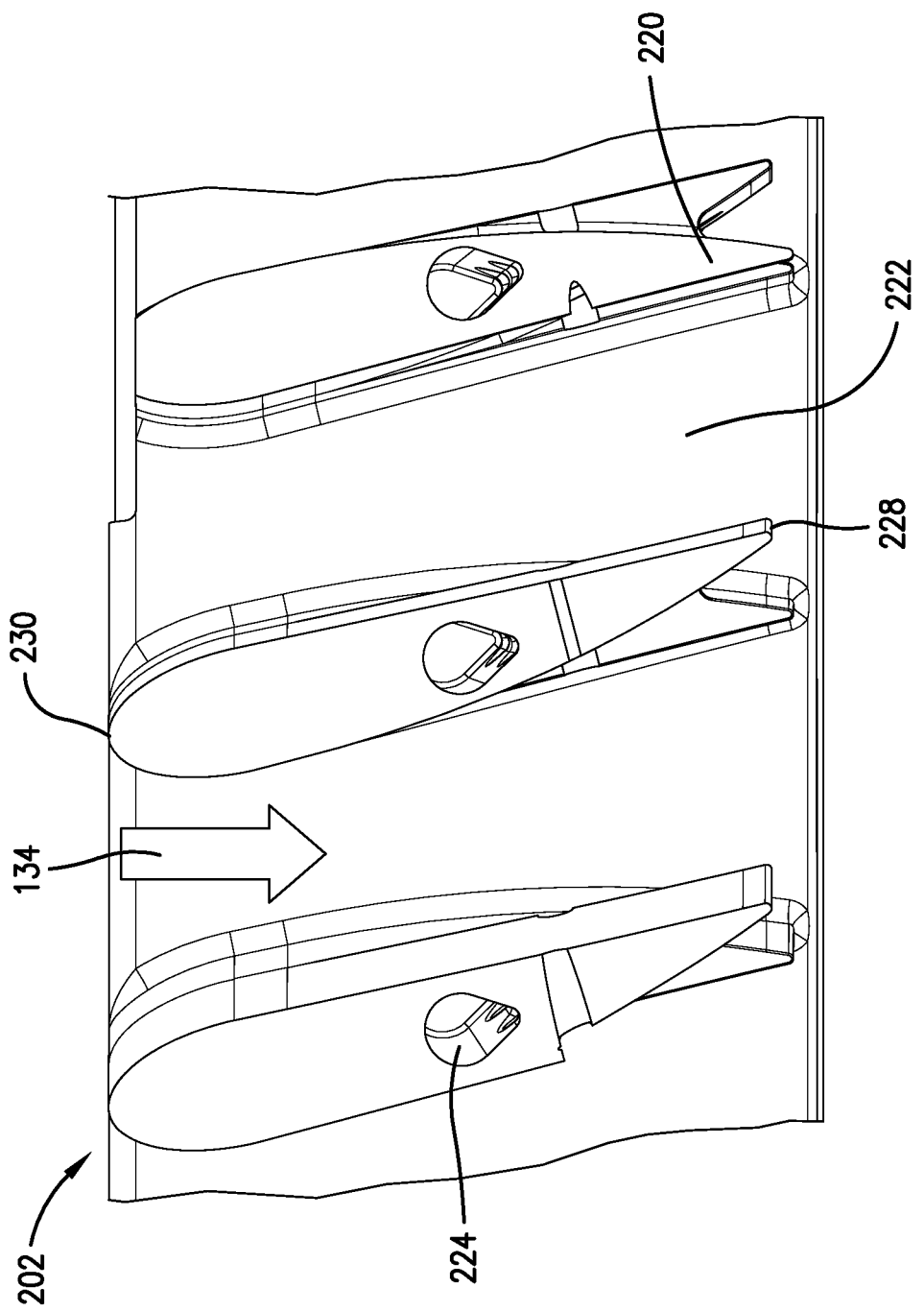
FIG. 12 is a cross-sectional, close-up view of the injector shown in FIGS. 4-5C.

As the injector 202 and/or vanes 220 are additively manufactured, the internal passageways forming cooling channels or fuel channels (such as the fuel feed holes 224 and fuel injection holes 226) will be integrally formed within the injector 202. In some embodiments, these passageways may include a non-circular cross-section in order to aid in the additive manufacturing process. For example, as shown in FIG. 12, the fuel feed hole 224 includes a substantially tear-drop shaped cross-sectional profile. This profile aids in the additive manufacturing process by reducing the amount of material that extends over the void of material left during the formation of a previous 2D slice of the 3D model. Put another way, the additive manufacturing process may not be able to readily accommodate overhangs of more than 45 degrees or similar without the manufactured part collapsing on itself. In this embodiment, the fuel feed holes 224 (and, in some embodiments, other internal passageways) include the tear-drop shaped cross-section to reduce the amount of overhang at the top half of the cross-sectional profile, thereby managing the printed ceiling of the fuel feed holes 224 in the printed directed and thus increasing the manufacturability of the first injector 202 and/or the plurality of second vanes 220.

The injectors discussed herein may be additively manufactured (or otherwise manufactured such as by machining, casting, forging, etc.) from any desired material. For example, in some embodiments the injectors are manufactured from a superalloy, such as, e.g., Inconel 718 (i.e., an alloy made chiefly of nickel and chromium, with the balance formed from numerous other metals) or a similar material providing high strength and corrosion resistance. Any desired and suitable material may be employed without departing from the scope of the disclosure.

In sum, the designs and embodiments discussed herein provide increased mixing of fuel and air while providing improved flame holding or anchoring mitigation. For example, the stepped, sinusoidal, or other irregular profile of the trailing edge of the injector vanes may create one or more streamwise vortices at the trailing edge providing mixing enhancement without the inclusion of a cross-stream, planar surface that may otherwise provide a surface for flame anchoring. By increasing the mixing of the fuel and air at the injector, embodiments of the injector discussed herein lead to improved emissions by the combustor all while being streamlined and configured for flame holding resistance, leading to improved life of the injector and reduced risk of injector and/or combustor failure.

From the foregoing, it will be seen that this disclosure is one well adapted to attain all the ends and objects set forth above, together with other advantages which are obvious and inherent to the system and method. It will be understood that certain features and sub-combinations are of utility and may be employed without reference to other features and sub-combinations.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

In the specification and claims, reference will be made to several terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and the claim, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Range limitations may be combined and/or interchanged. Such ranges are identified and include all the sub-ranges contained therein unless context or language indicates otherwise.

As used herein, the terms "axial" and "axially" refer to directions and orientations extending substantially parallel to a center longitudinal axis of the combustor. The terms "radial" and "radially" refer to directions and orientations extending substantially perpendicular to the central axis. Moreover, directional references, such as, "top," "bottom," "front," "back," "side," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

The terms "coupled," "fixed," "attached to," and the like refer to both direct coupling, fixing, or attaching, as well as indirect coupling, fixing, or attaching through one or more intermediate components or features, unless otherwise specified herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

We claim:

1. An injector for a combustor of a gas turbine engine, the injector comprising:
   a plurality of first vanes radially arrayed about a central axis of the injector;
   a plurality of second vanes radially arrayed about the central axis of the injector and disposed radially inward of the plurality of first vanes, each of the plurality of second vanes including:
   a leading edge;
   a trailing edge including a stepped profile comprising:
      a radially outer first portion having a first length in a radial direction;
      a radially intermediate second portion having a second length in the radial direction; and
      a radially inner third portion having a third length in the radial direction,
      the second length being greater than the third length, and the third length being greater than the first length,
      the radially intermediate second portion including a second trailing end circumferentially offset from a first trailing end of the radially outer first portion and a third trailing end of the radially inner third portion;
   a plurality of fuel injection holes disposed on the radially intermediate second portion nearer to the trailing edge than to the leading edge and configured to inject fuel into compressed air passing over the second vane; and
   a fuel feed hole in fluid communication with the plurality of fuel injection holes and configured to supply the fuel to the plurality of fuel injection holes,
   wherein the trailing edge stepped profile is configured to induce turbulence in the compressed air to thereby mix the fuel with the compressed air.

2. The injector of claim 1, further comprising a first relief cut disposed between the radially outer first portion and the radially intermediate second portion and a second relief cut disposed between the radially intermediate second portion and the radially inner third portion.

3. The injector of claim 1, wherein the third trailing end of the radially inner third portion includes a portion of a substantially sinusoidal shape.

4. The injector of claim 1, wherein the fuel feed hole includes a tear-drop shaped cross-section profile.

5. The injector of claim 1, wherein each of the plurality of first vanes includes an elliptical cross-sectional profile.

6. A combustor for a gas turbine engine, the combustor comprising:
- a combustion liner defining a combustion zone therein; and
- a first injector surrounding the combustion liner and comprising:
  - a plurality of first vanes radially arrayed about a central axis of the injector, each of the first vanes separated from an adjacent one of the first vanes by one of a plurality of first passages forming part of a radially outer flow path;
  - a plurality of second vanes radially arrayed about the central axis of the injector and disposed radially inward of the plurality of first vanes, each of the second vanes separated from an adjacent one of the second vanes by one of a plurality of second passages forming part of a radially inner flow path, each of the plurality of second vanes including:
    - a leading edge;
    - a trailing edge including a stepped profile comprising:
      - a radially outer first portion having a first length in a radial direction;
      - a radially intermediate second portion having a second length in the radial direction; and
      - a radially inner third portion having a third length in the radial direction,
      - the second length being greater than the third length, and the third length being greater than the first length,
      - the radially intermediate second portion including a second trailing end circumferentially offset from a first trailing end of the radially outer first portion and a third trailing end of the radially inner third portion;
  - a plurality of fuel injection holes disposed on the radially intermediate second portion nearer to the trailing edge than to the leading edge and configured to inject fuel into compressed air passing through the radially inner flow path; and
  - a fuel feed hole in fluid communication with the plurality of fuel injection holes and configured to supply the fuel to the plurality of fuel injection holes,
  wherein the trailing edge stepped profile is configured to induce turbulence in the compressed air passing through the radially inner flow path to thereby mix the fuel with the compressed air upstream the combustion chamber.

7. The combustor of claim 6, further comprising a first relief cut disposed between the radially outer first portion and the radially intermediate second portion and a second relief cut disposed between the radially intermediate second portion and the radially inner third portion.

8. The combustor of claim 6, wherein the third trailing end of the radially inner third portion includes a portion of a substantially sinusoidal shape.

9. The combustor of claim 6, further comprising a second injector downstream of the first injector along the radially outer flow path, the second injector being configured to mix fuel with compressed air passing through the radially outer flow path to thereby mix the fuel with the compressed air upstream of the combustion chamber.

10. The combustor of claim 9, wherein the fuel feed hole includes a tear-drop shaped cross-section profile.

11. The combustor of claim 9, wherein each of the plurality of first vanes includes an elliptical cross-sectional profile.

* * * * *